DRAW CONDITIONS

TEMP. OF A PIN — 90°C
TEMP. OF A PLATE — 130°C
DRAW RATIO — 3.5

DRAW CONDITIONS

TEMP. OF A PIN — 70°C
TEMP. OF A PLATE — 150°C
DRAW RATIO — 5.5

INVENTORS.
HIDEO KOMATSU, SADAO YUGUCHI
MASAMITSU TANIMURA and
HIROSHI MATSUKAWA BY Paul & Paul
ATTORNEYS.

United States Patent Office 3,705,130
Patented Dec. 5, 1972

3,705,130
FIBER FORMING POLYESTER COMPOSITION
AND FIBER PRODUCED THEREFROM
Hideo Komatsu, Sadao Yuguchi, Masamitsu Tanimura, and Hiroshi Matsukawa, Otsu, Japan, assignors to Toray Industries, Inc., Tokyo, Japan
Filed July 28, 1971, Ser. No. 166,884
Claims priority, application Japan, July 30, 1970, 45/66,088
Int. Cl. C08g 17/08
U.S. Cl. 260—47 C                12 Claims

ABSTRACT OF THE DISCLOSURE

A novel flame retardant fiber forming polyester composition, useful as a textile fiber, is synthesized from (a) alpha, omega-bis (-2,6 dichloro - 4 - carboxy - phenoxy) alkane and (b) alkylene glycol.

GENERAL FIELD OF THE INVENTION

This invention relates to a novel fiber forming polyester composition and to a textile fiber produced therefrom having a high degree of crystallinity, a high tensile strength, excellent dimensional stability, a high Young's modulus and excellent flame retardant properties.

DISCUSSION OF THE PRIOR ART

Polyesters, particularly those consisting mainly of polyethylene terephthalate, have high softening points, a high crystallinity, a high degree of molecular orientability and excellent thermal stability. Such polyesters have been produced industrially and used as fibers and films. Further, in order to improve the dyeability and pilling resistance of such polyester fibers, the use of various kinds of copolyesters has been suggested.

Although polyester fibers are not as inflammable as cotton or rayon, they are not flame retardant when the fiber is prevented from dripping while burning. In recent years, the market has desired and sometimes even required flame retardant properties for interior fabrics and textiles such as curtains, carpets and the like.

Heretofore it has been suggested, for the purpose of increasing the flame retardant properties of polyester textile materials, to coat a flame retardant material on the surface of such material, or to mix a flame retardant with the polyester used for making the fiber. However, the former method produces a product which has a poor wash resistance and poor durability. The latter method is also not preferable because a considerable amount of retardant is needed and because of the presence of the retardant the resulting polyester composition has poor spinnability and the resulting fiber has poor draw characteristics and other desirable properties are lost.

Polyester synthesized from alpha, omega-bis (-2,6 dichloro-4-carboxy-phenoxy) ethane and ethylene glycol have also been suggested as a flame retardant polyester in Japanese patent publication No. 37/13,799. However, because of its low crystallinity and a poor dimensional stability, this polyester is not used as a fiber or film in spite of its excellent flame retardant properties.

SUMMARY OF THE INVENTION

It has been found that polyesters which have high crystallinity and good flame, retardant properties may be prepared provided they utilize the following repeating unit:

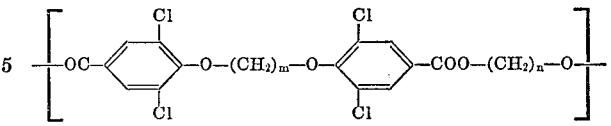

wherein $m$ is a number selected from the group consisting of 2 and 4, $n$ is a number selected from the group consisting of 4 and 6, and $n$ is larger than $m$.

DETAILED DESCRIPTION OF THE INVENTION

Figure 1:
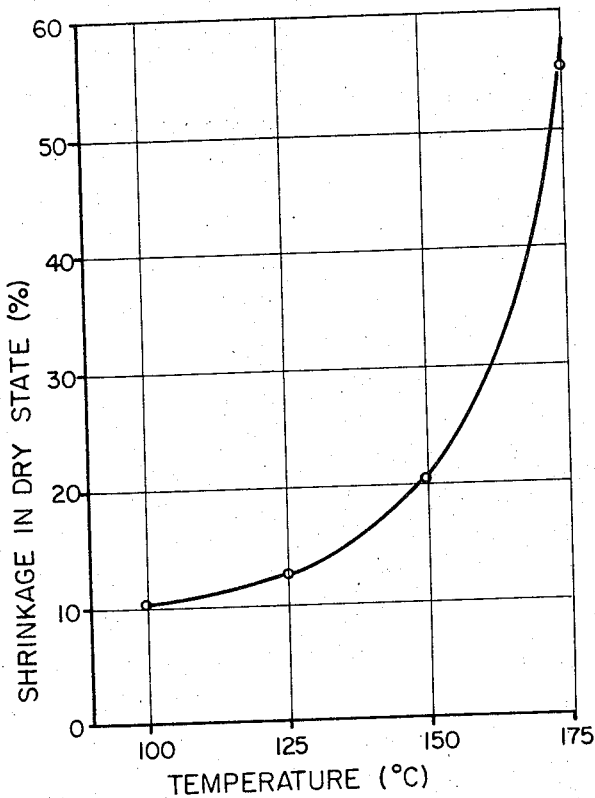
FIG. 1 is a graph showing the relation between temperature and shrinkage of a fiber not according to this invention and obtained from a polyester having the repeating unit above referred to, where $m$ and $n$ are equal and are 2.
Figure 2:
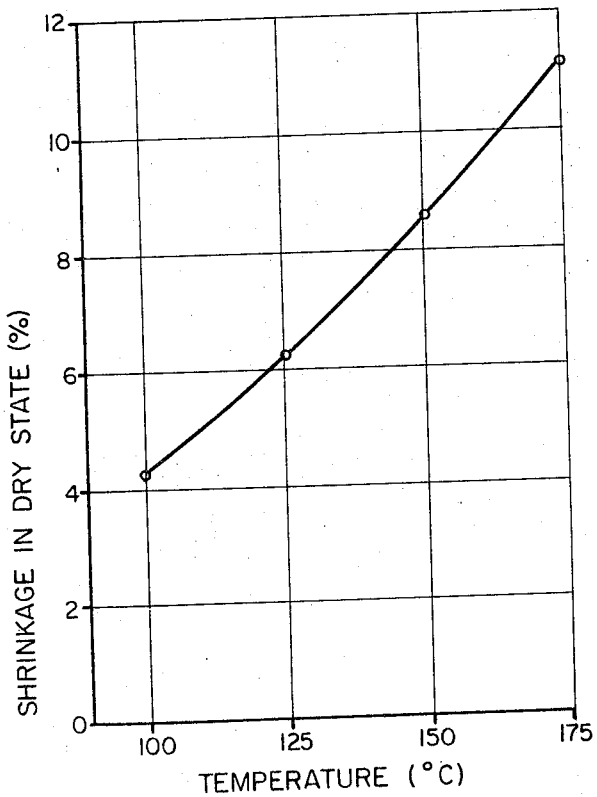
FIG. 2 is a graph showing the relation between temperature and shrinkage of the fiber obtained from a polyester having the aforementioned repeating unit, where $m$ is 2 and $n$ is 4.

An object of this invention is to provide a novel polyester having excellent flame retardant properties and a high degree of crystallinity. Another object of this invention is to provide a novel polyester fiber having excellent flame retardant properties, excellent dimensional stability, a high tensile strength and a high initial Young's modulus. Other objects of this invention will be described hereinafter.

The objects of this invention are achieved by providing polyesters including a repeating unit of the formula

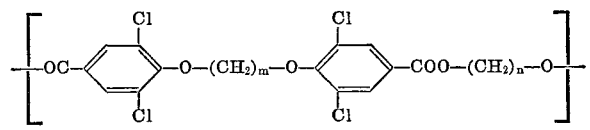

wherein $m$ is a number selected from the group consisting of 2 and 4, $n$ is a number selected from the group consisting of 4 and 6, and $n$ is a larger number than $m$.

These polyesters are produced by condensation polymerization of alpha, omega-bis (2,6-dichloro 4-carboxy phenoxy) alkanes and/or their esters and alkylene glycols. The alpha, omega-bis (2,6-dichloro 4-carboxy phenoxy) alkanes or their ester derivatives used in this invention are represented by the following formula:

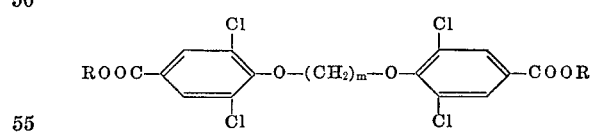

wherein R is a member selected from the group consisting of H, alkyl group group having 1-8 carbon atoms and phenyl, and $m$ is 2 or 4 as defined above. The alkylene glycols used in this invention are represented by the following formula:

$$HO-(CH_2)_n-OH$$

wherein $n$ is 4 or 6 and larger than $m$ as defined above.
Concretely, alkylene glycols used in this invention are 1,4-butane diol and 1,6-hexane diol.

Polyesters comprising repeating unit of the formula

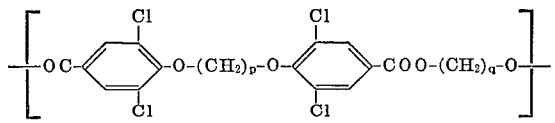

have high crystallinity when $p$ is an even number in the range of 2-12, $q$ is an even number in the range of 4-12 and $q$ is the same as $p$ or a larger number than $p$. When $p$ is a larger number than $q$, or when $p$ and/or $q$ are odd numbers, the polyesters have poor crystallinity.

The degree of crystallinity of a polyester may be illustrated by its heat of fusion (hereinafter indicated as $\Delta H$). The $\Delta H$, as already well known theoretically, is a measure of the degree of crystallinity of a polymer. Specifically, when the polymer is converted to fiber or film, the $\Delta H$ is very important because of its relation to viscoelasticity, thermal properties and dimensional stability of the polymer. With respect to the polyester represented by the above formula, when $p$ is an even number in the range of 2-12, $q$ is an even number in the range of 4-12 and $q$ is the same number as $p$ or is larger than $p$, this polyester has a $\Delta H$ of at least 3 cal./g. When the $\Delta H$ of the polyester is at least 3 cal./g. this polyester may have a high crystallinity. However, to satisfy commercial requirements for fibers or films, a $\Delta H$ of at least 8 cal./g. of the polyester is desired. The polyesters of this invention have a $\Delta H$ of at least 8 cal./g.

When $p$ is larger than $q$, or when $p$ and/or $q$ are odd numbers, the polyester has a $\Delta H$ of less than 1 cal./g.

When $p$ and $q$ are both 2, the polyester might be expected to have high crystallinity because of the regularity of polymer molecules. However, the polyester has a $\Delta H$ of 1.4 cal./g. and poor crystallinity.

Further, in order to be useful as fibers or films, polyesters should have melting points within a proper range, as well as crystallinity. Namely, in order to be useful as fibers or film, a polyester should have a melting point of at least 180° C. However, for the purpose of melt shaping such as melt spinning, said polyesters are preferred to have melting points of not more than 300° C. With respect to polyesters represented by the above formula, when $p$ is an even number 2 or 4, $q$ is an even number 4 or 6, and $q$ is a larger number than $p$, the polyesters have melting points of 180-300° C. and also have high crystallinity.

An alpha, omega-bis (2,6-dichloro 4-carboxy phenoxy) alkane used in this invention, for example, can be synthesized according to the following method.

Using chlorine gas, p-hydroxy benzoic acid is chlorinated to 3,5-dichloro 4-hydroxy benzoic acid and the resulting product is esterified by alkyl alcohol to 3,5-dichloro 4-hydroxy benzoic acid alkyl ester. The 3,5-dichloro 4-hydroxy benzoic acid ester is reacted with alpha, omega-dihalogeno polymethylene in the presence of alkaline compound to an alpha, omega-bis (2,6-dichloro 4-alkoxy carbonyl phenoxy) alkane. The alpha, omega-bis (2,6-dichloro 4-alkoxy carbonyl phenoxy) alkane may, if desired, be modified by hydrolysis in the presence of alkali catalyst. However, alpha, omega-bis (2,6-dichloro 4-alkoxy carbonyl phenoxy) alkane is generally used for polymerization in this invention by itself.

The alkyl alcohol preferably used in the above method has 1-8 carbon atoms, such as methyl alcohol, ethyl alcohol, propyl alcohol and n-butyl alcohol. However, other alcoholic compounds such as phenol may be used, for example.

The alpha, omega-dihalogeno polymethylene preferably used in the above method is alpha, beta-dichloro ethane or alpha, delta-dichloro butane. However, other alpha, omega-dihalogeno polymethylenes such as alpha, beta-dibromo ethane, alpha, delta-dibromo butane, alpha, beta-diiodo ethane and alpha, delta-diiodo butane may be used.

Alkaline compounds such as metallic sodium, metallic potassium, sodium methoxide, sodium ethoxide, sodium propoxide, potassium methoxide, potassium ethoxide and potassium propoxide may be used, for example.

Alkali catalysts such as sodium hydroxide, sodium carbonate, potassium hydroxide, potassium carbonate and tetraethylammonium hydroxide may be used, for example.

When the polymerization reaction is carried out in this invention, less than 25 mol percent of other ester forming difunctional compounds may be used if desired. These ester forming difunctional compounds are, for example, dicarboxylic acid such as succinic acid, glutaric acid, adipic acid, azelaic acid, sebacic acid, terephthalic acid, isophthalic acid, naphthaline 2,6-dicarboxylic acid, diphenyl 4,4'-dicarboxylic acid, cyclohexane 1,4-dicarboxylic acid, cyclohexane 1,3-dicarboxylic acid, alpha, beta-bis (4-carboxy phenoxy) ethane, alpha, delta-bis (4-carboxy phenoxy) butane and ester derivatives thereof, dihydroxy compounds such as ethylene glycol, neopentyl glycol, 1,3-propane diol, 1,5-pentane diol, 1,7-heptane diol, 1,9-nonane diol, diethylene glycol, triethylene glycol, polyethylene glycol, polypropylene glycol, 1,3-dimethylol cyclohexane, 1,4-dimethylol cyclohexane, 1,4-bis (beta-hydroxy ethoxy) benzene, 1,3-bis (beta-hydroxy ethoxy) benzene, p-xylylene glycol, m-xylylene glycol, and hydroxy carboxylic acid compounds and/or ester derivatives thereof such as p-(beta hydroxy ethoxy) benzoic acid, p-hydroxy benzoic acid, p-hydroxy methyl benzoic acid, hydroxy pivalic acid. However the ester forming difunctional compounds are not limited to the above examples. The preferred amount of these difunctional compounds used in this polymerization reaction is not more than about 25 mol percent based on total amount of polymerizable mixture. When the amount of these difunctional compounds exceeds 25 mol percent, the resulting copolyester has extremely poor crystallinity.

Further, in this polymerization reaction, monofunctional ester forming compounds such as benzoic acid, stearic acid, alkoxy polyethylene glycol and ester derivatives thereof and tri- or tetra functional compounds such as trimellitic acid, trimesic acid, pyromellitic acid, glycerol, tri methylol propane, pentaerythrytol and ester derivatives thereof may be used.

When the polymerization reaction according to this invention is carried out, the dicarboxylic acid and/or its ester derivative and the alkylene glycol are reacted in the molten state. For instance, to alpha, omega-bis (2,6-dichloro 4-alkoxy carbonyl phenoxy) alkane, an equimolar amount (or more) of alkylene glycol, preferably, 1.5-5.0 times the molar amount of alkylene glycol, is added and the mixture is reacted at a temperature between 150° C. and 250° C. under atmospheric pressure while removing alcohol produced from this reaction. In this reaction, small amount of ester exchange catalyst is used. As ester exchange catalysts used in this reaction, for example, the following conventional and well known catalysts can be listed: oxidized compounds or salts of Ca, Mg, Zn, Mn and Co, titanium compounds such as titanic acid, titanic acid ester, ammonium titanate and alkali metal compounds such as lithium hydroxide, sodium hydroxide, potassium hydroxide, sodium alkoxide, sodium carbonate and potassium alkoxide.

However, suitable ester exchange catalysts are not limited to the above examples. The amount of such catalyst used in this reaction is 0.01-1% by weight, preferably 0.03-0.3% by weight, based on alpha, omega-bis (2,6-dichloro 4-carboxy phenoxy) alkane and/or its ester derivative.

The reaction mixture thus ester-exchanged is polymerized at a higher temperature than the melting point of the resulting polymer but below 300° C. under reduced pressure, preferably below 1 mm. Hg in the presence of the polymerization catalyst, while removing alkylene glycol producing from this polymerization.

As the polymerization catalysts used in this polymerization, the following compounds can be listed: antimony compounds such as antimony oxide and antimony fluoride, lead compounds such as lead oxide and lead acetate and titanium compounds used in the ester exchange reaction. However, suitable catalysts are not limited to the above examples. When a titanium compound is used in the ester exchange reaction, it is not necessary to add a polymerization catalyst. The amount of the polymerization catalyst is 0.001–1% by weight, preferably 0.01–0.3% by weight, based on the dicarboxylic component. The polymerization catalyst can be added to the reaction mixture before the ester exchange reaction or in the midst of the polymerization, intermittently. A polymerization temperature in the range between 250–300° C. is preferably employed. The polymerization time is determined by the desired degree of polymerization of the resulting polymer. In order to prevent undesirable discoloration, a phosphor compound such as phosphoric acid, phosphoric acid ester, phosphorus acid or phosphorus acid ester may be added to the polymerization system.

Further, pigments such as titanium oxide and carbon black can be added to the polymerization system in any stage, before or after the ester exchange reaction, before or after polymerization or in the midst of polymerization. However these pigments have to be mixed into the polymerization system uniformly.

The polyesters of this invention have high crystallinity in spite of the presence of chlorine atoms which exhibit a large steric hindrance.

Polyesters having flame retardant properties and high crystallinity are used for making fibers and films. Conventional molding methods can be used.

When the polyester of this invention is melt spun by conventional methods, filaments having good drawability are obtained. A melt spinning temperature below 300° C. is generally used in order to avoid the undesired discoloration of the product.

The drawing of the filaments is normally carried out over a pin and/or a plate heated at a temperature of at least 50° C. The filaments are drawn to at least double, preferably 3–6 times, their original length (draw ratio range of 2 to 6). In some cases it is of advantage to carry out heat treatment at a temperature of 150–200° C. after drawing.

The fibers thus obtained have a tensile strength in excess of 3.0 g./d., an initial Young's modulus of at least 40 g./d., a shrinkage of at most 15% in the dry state at a temperature of 150° C., good flame retardant properties and a readily dyeable property with dispersion dyestuffs.

Because of these characteristics, when the fibers of the present invention are employed in knitted goods or woven fabrics they exhibit good dyeability, excellent dimensional stability and a high bending modulus.

The fibers, in the form of filaments and staple, are also useful in clothing, interior goods, beddings, carpeting and industrial yarns and fabrics such as tire cord, for example.

This invention is further illustrated by the following examples. In connection with the examples, the physical properties of the polyesters were measured by the following methods:

(i) The ΔH (heat of fusion) was measured using a DSC (differential scanning calorimeter) type IB produced by Perkin Elmer Corporation. A small piece of the polymer (about 10 mg.) was heated to the temperature 10° C. lower than its melting point at a heating rate of 40° C./min. and treated at this temperature for 30 minutes. After treating, the polymer was cooled to room temperature. Then, the polymer was fused by elevating its temperature at a heating rate of 10° C./min. The ΔH of the polymer was calculated from the area of peak of fusion by using tin as the standard substance.

(ii) Melting point and glass transition point: The melting point and the glass transition point were also measured using a DSC (differential scanning calorimeter), type IB, produced by Perkin Elmer Corporation. A small piece of the quenched amorphous polymer (about 10 mg.) was heated at a rate of 40° C./min. If the polymer was crystallizable, two endotherm peaks and one exotherm peak generally appeared, in which the peak temperature of one endotherm peak was lower than that of the exotherm peak, and the peak temperature of the other endotherm peak was higher than that of the exotherm peak. The melting point was taken as the peak temperature of the higher endotherm peak, and the glass transition point was taken as the peak temperature of the lower endotherm peak.

(iii) Shrinkage in the dry state: A sample yarn in its relaxed state was heated at a temperature between 100° C. and 175° C. for 30 minutes. The length of the yarn before and after treatment was measured under a load of 50 mg./d. and the degree of shrinkage was calculated.

(iv) Initial Young's modulus: A sample yarn conditioned at a temperature of 20° C. and relative humidity of 65% was pulled at a tensile speed of 100%/min. to depict a stress-strain curve. The initial Young's modulus was obtained from the gradient of the initial part of said curve.

(v) Inherent viscosity: 0.125 g. of the polymer was dissolved in 25 ml. of o-chloro phenol. Then the flow times of this solution and the solvent (o-chloro phenol) were measured at 25° C. using an Ostwald viscosimeter. The inherent viscosity was calculated from the following formula:

$$\mu\text{inh} = \frac{\ln t/to}{C}$$

$\mu$inh: Inherent viscosity
$t$: Flow time of the solution (sec.)
$to$: Flow time of the solvent (sec.)
$C$: Concentration of the solution (g./100 ml.)

EXAMPLE 1

To 50 parts by weight of alpha, beta-bis (2,6-dichloro-4-methoxy carbonyl phenoxy) ethane (melting point of 199–201° C.) and 23 parts by weight of 1,4-butane diol, 0.03 part by weight of tetrabutyl titanate was added as an ester exchange and polymerization catalyst. The mixture was reacted by heating to a temperature of 200–205° C. under atmospheric pressure while removing methyl alcohol produced from this reaction. After maintaining this temperature for 2 hours, the temperature was elevated to about 270° C. and an excessive amount of 1,4-butane diol was removed by evaporation. After removing the excess of 1,4-butane diol, the pressure was reduced gradually while maintaining a temperature of about 270° C. The reaction mixture was polymerized at this temperature under a pressure of 0.1–0.5 mm. Hg for 3 hours while mixing. The polymer thus obtained had a melting point of 247° C., a glass transition point of 60° C. and a ΔH of 10.0 cal./g. This polymer had a high crystallinity. Further, it had an inherent viscosity of 0.68 and exhibited a light yellow color and good flame retardant properties.

This polymer was extruded through a spinneret having six orifices at a spinning temperature of 260° C. The extruded filaments were drawn to 5 times their original length on a hot pin at 70° C. and over a hot plate at 150° C. to produce drawn filaments having total denier of 42. The drawn filaments had the physical properties shown in Table 1.

Table 1

| | |
|---|---|
| Tensile strength g./d. | 4.1 |
| Elongation percent | 13 |
| Initial Young's modulus g./d. | 61 |
| Shinkage in dry state: | |
| 125° C. percent | 6.2 |
| 150° C. do | 8.6 |
| 175° C. do | 11 |

The drawn filaments had good heat setting properties and were readily dyeable with a dispersing dyestuff.

The X-ray diffraction pattern of this drawn filament exhibited visible diffraction point having less dispersion of X-ray effected by the amosphous part of the polymer.

COMPARATIVE TEST 1

To 50 parts by weight of alpha, beta-bis (2,6-dichloro-4-methoxy carbonyl phenoxy) ethane (melting point of 199–201° C.) and 16.7 parts by weight of ethylene glycol, 0.03 part by weight of tetra butyl titanate was added as an ester exchange and polymerization catalyst. The mixture was reacted by heating to a temperature of 200–205° C. under atmospheric pressure while removing methyl alcohol produced from the reaction. After maintaining this temperature for 2 hours, the temperature was elevated to about 260° C. and excess ethylene glycol was removed by evaporation. The pressure was reduced gradually while maintaining the temperature at about 260° C. The reaction mixture was polymerized at this temperature under a pressure of 0.1–0.5 mm. Hg for 3 hours while mixing. Thus a polymer having a light yellow color was obtained.

The polymer had a melting point of 206° C., a glass transition point of 92.5° C., a ΔH of 1.4 cal./g. and an inherent viscosity of 0.63. This polymer had good flame retardant properties. However, it had a lower crystallinity.

This polymer was extruded through a spinneret having six orifices at a spinning temperature of 250° C. The extruded filaments were drawn to 3.0 times their original length on a hot pin at 90° C. and over a hot plate at 130° C. to produce drawn filaments having a total denier of 42.

The drawn filaments had physical properties as shown in Table 2.

Table 2

Tensile strength _____ g./d__ 2.8
Elongation _____ percent__ 14
Initial Young's modulus _____ g./d__ 53
Shrinkage in dry state:
   125° C. _____ percent__ 13
   150° C. _____ do____ 21
   175° C. _____ do____ 55

Because of poor crystallinity, this drawn filament had large shrinkage in the dry state and was not preferred as a fiber.

EXAMPLE 2

According to the method described in Comparative Test 1, polymerizable mixtures shown in Table 3 were polymerized. Table 4 shows the results.

COMPARATIVE TEST 2

To 50 parts by weight of alpha, delta-(2,6-dichloro 4-methoxycarbonyl phenoxy) butane and 15 parts by weight of ethylene glycol, 0.03 part by weight of tetra butyl titanate was added as ester exchange and polymerization catalyst. The mixture was reacted by heating to a temperature of 200–205° C. under atmospheric pressure while removing methyl alcohol produced from this reaction. After maintaining this temperature for 2 hours, the temperature was elevated to about 260° C. and excess ethylene glycol was removed by evaporation. The pressure was reduced gradually while maintaining the temperature at about 260° C. The reaction mixture was polymerized at this temperature under a pressure of 0.1–0.5 mm. Hg for 3 hours while mixing.

The polymer thus obtained had a glass transition point of 71° C.

The polymer was extruded through a slit at a temperature of 230° C. to form a film. The extruded film was elongated to 5 times its original length by orientating along its longitudinal direction at 80° C. The oriented film was heat treated at a temperature of about 140° C. for 20 minutes. The resulting film crystallized a little, and had a melting point of 159° C. This polymer had a ΔH of about 0 cal./g. This shows that the polymer is substantially amorphous. The polymer had an inherent viscosity of 0.63 and a light yellow color.

The following is claimed:

1. A flame retardant polyester readily formed into fibers and films consisting essentially of at least about 75 mol percent of a repeating unit represented by the formula

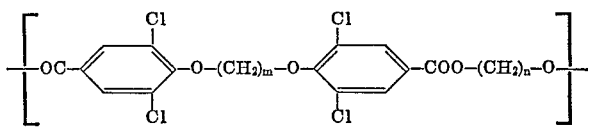

wherein $m$ is a number selected from the group consisting of 2 and 4, $n$ is a number selected from the group consisting of 4 and 6, and $n$ is larger than $m$.

2. A polyester according to claim 1 having a melting point of 180–300° C.

3. A polyester according to claim 1 having a heat of fusion of more than about 8 cal./g.

TABLE 3

| | Dicarboxylic acid component [amount (parts by weight)] (melting point, ° C.) | Alkylene glycol, amount (parts by weight) | | Ester exchange and polymerization catalyst, amount (parts by weight) | |
|---|---|---|---|---|---|
| 1 | Alpha, beta-bis (2,6-dichloro 4-methoxycarbonyl phenoxy) ethane [50] (199–201) | 1,6-hexane diol | 30 | Tetra butyl titanate | 0.03 |
| 2 | Alpha, delta-bis (2,6-dichloro 4-methoxycarbonyl phenoxy) butane [50] | do | 29 | do | 0.03 |
| 3 | Alpha, beta-bis (2,6-dichloro 4-methoxycarbonyl phenoxy) ethane [50] | 1,8-octane diol | 38 | do | 0.03 |
| 4 | Alpha, delta-bis (2,6-dichloro 4-methoxycarbonyl phenoxy) butane [50] (124–125) | 1,4-butane diol | 22 | do | 0.03 |
| 5 | Alpha, delta-bis (2,6-dichloro 4-methoxycarbonyl phenoxy) butane [50] | 1,8-octane diol | 35 | do | 0.03 |
| 6 | Alpha, zeta-bis (2,6-dichloro 4-methoxycarbonyl phenoxy) hexane [50] (80–82) | 1,6-hexane diol | 27 | do | 0.03 |
| 7 | Alpha, zeta-bis (2,6-dichloro 4-methoxycarbonyl phenoxy) hexane [50] | 1,8-octane diol | 33.5 | do | 0.03 |

TABLE 4.—PROPERTIES OF RESULTING POLYMERS

| | Melting point (° C.) | Glass transition point (° C.) | Heat of fusion, ΔH (cal./g.) | Inherent viscosity | Flame retardant property |
|---|---|---|---|---|---|
| 1 | 213 | 47 | 8.4 | 0.59 | Good. |
| 2 | 192 | 29 | 9.3 | 0.60 | Do. |
| 3 | 138 | 30 | 5.0 | 0.53 | Do. |
| 4 | 156 | 46 | 5.2 | 0.65 | Do. |
| 5 | 129 | 17.5 | 6.9 | 0.52 | Fair. |
| 6 | 136 | 13 | 7.6 | 0.56 | Do. |
| 7 | 74 | 5 | 4.6 | 0.54 | Do. |

4. A flame retardant polyester readily formed into fibers and films consisting essentially of a repeating unit represented by the formula

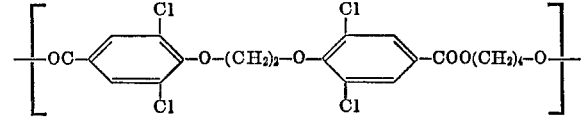

5. A flame retardant polyester readily formed into fibers and films consisting essentially of a repeating unit represented by

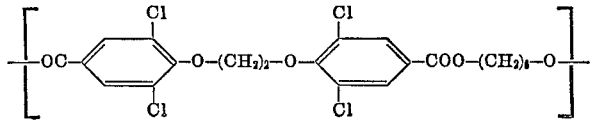

6. A flame retardant polyester readily formed into fibers and films consisting essentially of a repeating unit represented by the formula

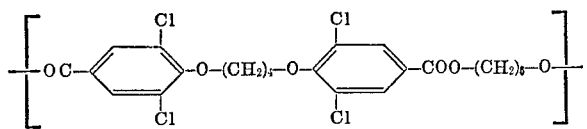

7. A fiber consisting of a polyester according to claim 1.
8. A fiber according to claim 7 having a melting point of about 180–300° C., an initial Young's modulus of at least about 40 g./d. and a shrinkage of at most about 15% in the dry state at a temperature of about 150° C.
9. A fiber consisting of a polyester according to claim 4.
10. A fiber consisting of a polyester according to claim 5.
11. A fiber consisting of a polyester according to claim 6.
12. A film consisting of a polyester according to claim 1.

References Cited
FOREIGN PATENTS
13,799   9/1962   Japan.

MELVIN GOLDSTEIN, Primary Examiner

U.S. Cl. X.R.
260—DIG 24